(12) United States Patent
Biffar

(10) Patent No.: US 7,187,278 B2
(45) Date of Patent: Mar. 6, 2007

(54) RULE BASED PROXIMITY AND TIME BASED TRACKING SYSTEM

(75) Inventor: Peter Biffar, 1060 High St., Palo Alto, CA (US) 94301

(73) Assignee: Peter Biffar, Palo Alto, CA (US)

( * ) Notice: Subject to any disclaimer, the term of this patent is extended or adjusted under 35 U.S.C. 154(b) by 608 days.

(21) Appl. No.: 10/221,409

(22) PCT Filed: Mar. 6, 2001

(86) PCT No.: PCT/US01/07098

§ 371 (c)(1),
(2), (4) Date: Feb. 28, 2003

(87) PCT Pub. No.: WO01/67127

PCT Pub. Date: Sep. 13, 2001

(65) Prior Publication Data

US 2004/0124977 A1 Jul. 1, 2004

(51) Int. Cl.
G08B 1/08 (2006.01)

(52) U.S. Cl. ............... 340/539.13; 340/539.14; 340/426.19; 340/568.1; 340/539.1; 340/825.36; 340/825.49; 340/988; 340/994; 340/989

(58) Field of Classification Search ........... 340/539.13, 340/539.14, 426.19, 568.1, 539.1, 540, 825.36, 340/825.49, 988, 989, 994
See application file for complete search history.

(56) References Cited

U.S. PATENT DOCUMENTS

| | | | |
|---|---|---|---|
| 5,519,403 A | 5/1996 | Bickley et al. ............. | 342/352 |
| 5,835,377 A | 11/1998 | Bush ..................... | 364/468.05 |
| 5,920,287 A * | 7/1999 | Belcher et al. ............. | 342/450 |
| 5,959,568 A * | 9/1999 | Woolley ..................... | 342/42 |
| 6,275,821 B1 * | 8/2001 | Danish et al. ................. | 707/3 |
| 6,460,025 B1 * | 10/2002 | Fohn et al. ................... | 706/45 |
| 6,631,271 B1 * | 10/2003 | Logan ..................... | 455/456.1 |
| 6,668,259 B1 * | 12/2003 | Ventura et al. ......... | 707/103 R |
| 6,837,436 B2 * | 1/2005 | Swartz et al. .......... | 235/472.02 |
| 6,917,979 B1 * | 7/2005 | Dutra et al. ................ | 709/229 |
| 6,919,803 B2 * | 7/2005 | Breed .................... | 340/539.14 |

FOREIGN PATENT DOCUMENTS

| | | |
|---|---|---|
| WO | WO 96/08760 | 3/1996 |
| WO | WO 96/16387 | 5/1996 |
| WO | WO 98/39749 | 9/1998 |

* cited by examiner

Primary Examiner—Daryl C Pope
(74) Attorney, Agent, or Firm—Michael A. Glenn; Glenn Patent Group

(57) ABSTRACT

A method and apparatus that automatically tracks, monitors and schedules the shipping of objects through carriers such as delivery trucks, ships, or planes is disclosed. A tracking tag is attached to each shipped object. The tracking tag and transportation system uses such techniques as GPS, cellular technology, and bar coding, and sensors such as those that make temperature, pressure, and noise measurements as sources of tracking information. Logic rules and hierarchical weights are given to each source, for any given condition so that the most accurate tracking is made. Tracking is continuous throughout the object's trip. Another set of logic rules is applied to take actions to intervene in the shipping process. For example if it seems the object is off schedule, upgrades or downgrades to the shipping are made. The transportation system can be integrated within a customer's company to facilitate easy scheduling, and production management. A user-friendly graphical user interface is available which displays item, time and distance related information.

68 Claims, 4 Drawing Sheets

RULE BASED PROXIMITY AND TIME BASED TRACKING SYSTEM

BACKGROUND OF THE INVENTION

1. Technical Field

The invention relates to the tracking and monitoring of an object. More particularly, the invention relates to an apparatus and to a family of methods that gather information on the location and transportation of an object, and that makes shipping decisions, independent of human input.

2. Description of the Prior Art

The tracking of shipping has increased over the years. As objects in transit move from place to place through, ships, planes, and trucks, carriers have sought to increase customer satisfaction by providing in-transit information. For example, Federal Express uses a bar code system in which a bar code is added to each shipped object. Each object is scanned at several points throughout its delivery trip. The scanned information is accessible to a customer through a customer service agent or through the Internet. One problem with this method of shipping is that the customer has no information regarding the object while it is in transit. All the information the customer can receive, is information regarding where the object has been scanned last. This information provides the customer with no insights to future events, such as whether the object will arrive on time. Furthermore, the customer has no method of intervening in the shipping process, such as changing for example the mode of shipping or upgrade the service level to expedited service to make up for lost time.

What is needed is a system, which uses the tracking information by for example monitoring the schedule and progress of an object in transit, and a system that can take in addition proactive actions based on that information such as for example making upgrades in service level to the shipping if the object is behind schedule.

Generally, the art of radio data communication and radio tracking is extensive. The most widely used system for position determination is presently the Loran-C System, established by the U.S. Coast Guard more than twenty years ago, for navigation on inland and coastal waters of the U.S.A. A Loran-C receiver simultaneously processes the signals received from a number of Loran-C broadcast stations, and determines its local coordinates from phase comparisons between the various signals and from (internal) tables of the known position of the signal sources. Loran-C offers a position uncertainty of about ⅙ mile in open areas and over water. The most significant deficiency of the Loran system is that it provides no communication path for voice or data message information.

Satellite-based systems providing a service similar to Loran-C are now in operation, such as the military and commercial versions of Global Positioning Satellite system (GPS). Such systems can provide accurate position determination (about a 50 m error for the commercial version of GPS) from signal received simultaneously from at least three high-orbiting satellites. In many respects, the GPS system works as a "Loran-C-in-the-sky," and performs well in open areas, but often does not work well in many consumer applications, and in urban areas. This is because the power levels from the satellites are very low and the mobile transponder requires a clear, direct view of the satellites for its operation. Moreover, the cost of commercial GPS and Loran-C receivers is excessive and there is no means by which the location of a positioned object can be communicated beyond the object itself.

Another position determining system is the Signpost system. The resolution of this system is the spacing between signposts, and the position is recorded as the vehicle passes the signpost. Unfortunately, the position of the vehicle between posts is unknown.

An interesting commercial version of a signpost system, developed by Amtech Corporation of Dallas, Tex., uses passive, coded tags, capable of being "scanned" by a locally strong RF signal at the signpost. Commercial versions of this system are used to keep track of the passive-responding "Toll-Tags" attached to automobiles and railroad cars. Toll-Tags have also been used for automatic toll-road fee collection.

Two other vehicle locating systems worth mentioning include the North American Teletrac (manufactured by the Teletrac Inc. of Vista, Calif.) and the Lo-jack (manufactured by the LoJack Corporation of Dedham, Mass.) vehicle recovery systems. The Teletrac system uses a high frequency paging channel to activate a homing transponder on the vehicle being tracked. The transponder transmits a repeated spread-spectrum sequence, which a network of base stations receive, and from the difference in the delay between the sequence received at pairs of base stations the system determine the differences in the signal propagation flight time. From these differences a position fix can be determined by hyperbolic multilateration.

The capacity of the Teletrac system is limited to approximately 35 position fixes per second, and the system has little or no capacity to convey user information to the mobile location or back to the system.

The Lo-jack system uses a paging channel to activate a homing device installed on a stolen vehicle. Once the vehicle operator informs the recovery service of the loss of the vehicle, the paging channel is used to activate the homing transmitter, which emits a user ID-code on its homing carrier. Police tracking vehicles, equipped with special Doppler direction finding receivers, then locate the vehicle by monitoring a combination of signal-strength and direction readings of the identified carrier being received.

A number of private data-networks have recently been built to provide mobile radio data communications. Early systems have been extensions of prior voice radio systems with analog modems included in the link to provide data transmission and reception. With the advent of Specialized Mobile Radio (SMR) and the birth of Cellular Radio Telephones (which is a particular implementation of SMR), full duplex data connections became possible. These implementations, unfortunately, have been based on the current technology of voice-radio channels, which limit the capacity of the channel to practical data transmission rates in the range of 1,200 to 19,200 baud, with 2,400 to 4,800 baud being typical, depending on link budget and equipment cost.

Several private and public radio data networks have been built along these lines by Ericsson, Motorola, and others. Data-modems have recently become available from several manufacturers to operate with cellular radio telephone systems and provide typical data rates of 2,400 baud.

Some satellite-based mobile data communications have been established in the Mobile Satellite Service (MSS), and companies such a Geostar, Qualcomm, and Hughes have offered the service to primarily long-distance trucking companies to allow them to stay in contact with their cross-country fleets. A mobile data communication link is often combined with a Loran-C navigational system to report the approximate location of the vehicle.

What is needed is a system which links all the aforementioned systems and applies logical and hierarchical rules to derive a location of a tracked item, so that the most accurate of tracking information is available. Also needed is a system which can provide relational information between an object and its transportation means so that a user knows whether an object is actually on the transportation means or not. Further, it would be advantageous to provide a system that collects all available information concerning an item in transit and that "mines" such information to determine, for example, whether an item that forms part of a coordinated, multipart shipment is due to arrive with all other parts of the shipment, or if any actions must be taken to meet a particular delivery commitment, or to protect items in transit, for example, from environmental extremes, Furthermore what is needed is a system, that takes the tracking information and relates it to other information, such as a planned schedule, and draws based on the deviation of planned versus actual conclusions. Finally, what is also needed is that such a system evaluates the carriers based on their performance, as actual performance is measured against planned performance.

SUMMARY OF THE INVENTION

The invention provides a mechanism that automatically tracks, monitors, and schedules the shipping of objects through carriers, such as delivery trucks, ships, or planes. A tracking tag, which may be any type of tracking mechanism, including but not limited to active and passive mechanisms, is attached to each shipped object. The tracking tag and a tracking system use such tracking techniques as GPS, cellular technology, bar coding, temperature, pressure, and noise measurements as sources of tracking information. A tracking tag attached to an object is compared to tracking tags attached to transportation means such as a truck or plane, to determine if the object is on the truck or plane and if the conditions on both the transit vehicle and in the package itself are being consistently reported. Logic rules and hierarchical weights are given to each information source, for any given condition, so that the most accurate tracking assessment is made. A source of tracking information is excluded if it is not plausible. Higher weight is given to tracking information that is more accurate, relative to less accurate tracking information.

The mechanism of this invention further takes action steps based on the tracking information. These action steps may be interventions into the shipping process to assure that initial targets are kept. In addition these action steps may include action steps, which are outside of the shipping process, such as instructing a production line that the expected items will arrive 24 hours later, sending out automatic alerts.

Tracking is continuous throughout the object's trip. If it seems that the object is off schedule, a scheduling system upgrades or downgrades to the shipping are made, and other shipments may be adjusted accordingly if a coordinated delivery of multiple items is expected. The transportation system, which combines the tracking and scheduling systems, can be integrated within a company's production system to facilitate easy scheduling, and production management. A user-friendly graphical user interface is available which displays, item, time, and distance related information.

DESCRIPTION OF THE PREFERRED EMBODIMENT

Figure 1:
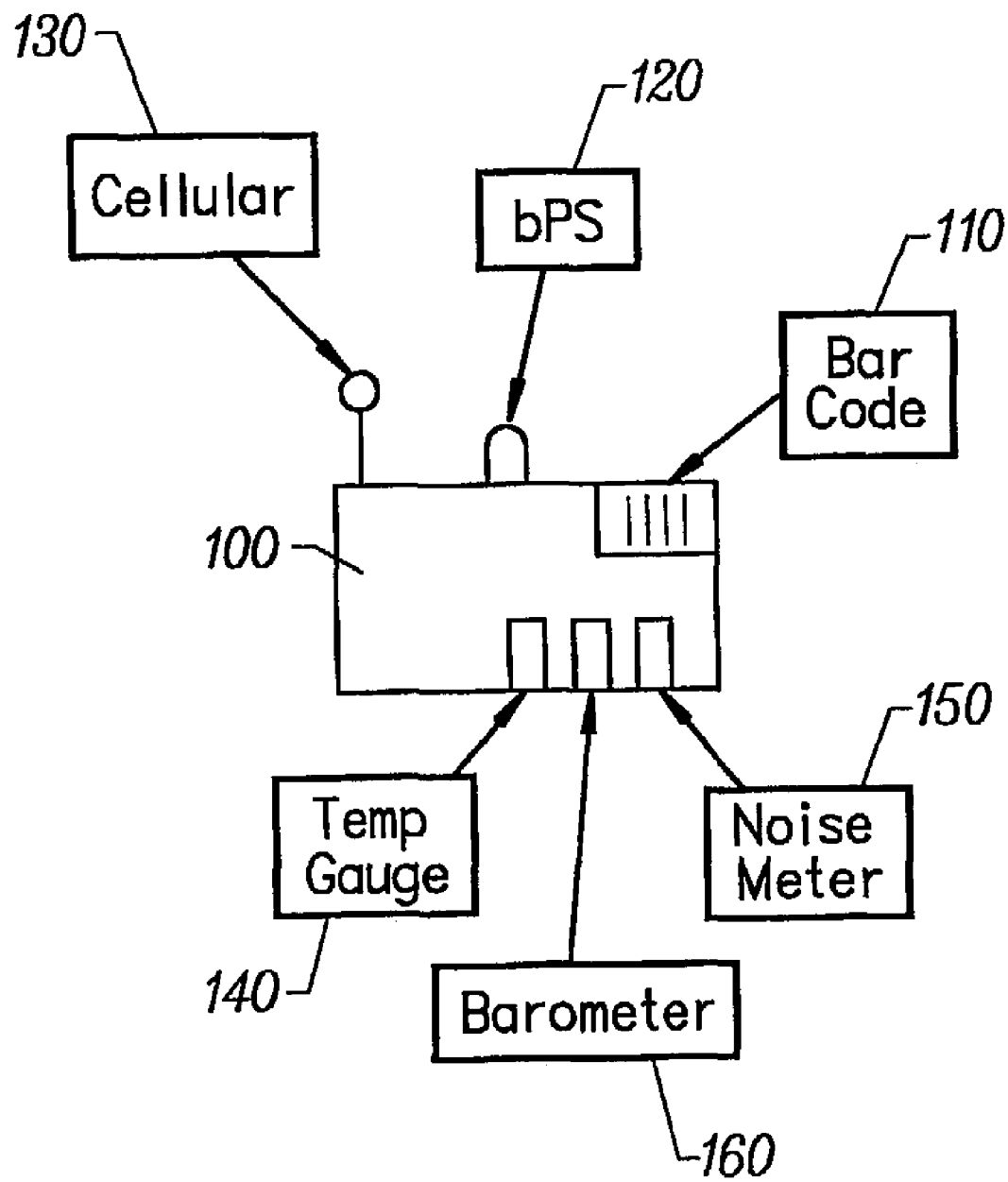
FIG. 1 is a diagram illustrating the sources of tracking information used by the tracking and scheduling system according to the invention.

FIG. 1 illustrates the tracking tag 100 and the sources of information with which it is concerned. The tracking tag 100 is attached to an object, usually by an adhesive or other fixation means. The tracking tag preferably has a unique bar code 110 that is registered with the transportation system (TS). The TS consists of a tracking system and a scheduler (discussed infra). The TS keeps such information regarding the object as sender, address, item description, and any special handling instructions. The tracking tag may include such elements as a GPS signal receiver 120, a cellular phone type radio transmitter and receiver 130, a temperature gauge 140, a noise meter 150, and a barometer 160.

The tracking tag receives GPS satellite signals to determine its location by methods well known in the art. Similarly, the tracking tag determines and communicates its position using the radio signals traditionally used in cellular phones. The tag communicates its GPS position through the cellular radio signal. In other embodiments of the invention, the tracking tag may be implemented in other technology as is known in the art, such as a passive transponder that operates via inductive coupling, a scanned device which may be passive or active, and in an IR system.

The bar code is scanned in at several points along the route of the transported object so that its position is known. For example, if the object is to be transported from Kansas City, Mo. to Hong Kong, it travels first by boat to New Orleans, by truck to Miami, and then by plane to Hong Kong. The bar code is scanned when it is picked up in Kansas City, when it is put on the boat, when it is removed from the boat, when it is put on the truck, when it is removed from the truck, when it is put on the plane, when it is taken off the plane, when it is put on a local delivery truck, and when it reaches its final destination. While the forgoing example describes the use of bar codes, those skilled in the art will appreciate that other tag identifying mechanisms may be used, such as via an RF transponder.

In general a tag can be any form of marking an object, that marking can be recognized manually or with the help of a machine. That reading can then serve as a data point regarding the location of the object. For example, the tag could be a handwritten marking on the outside of the object. Thus, tags can be very simple, such as a printed identification number, a handwritten number, or barcode. For purposes of the discussion herein, a tag can comprise anything which can be read.

The tags used, could be "virtual" tags. For example twelve items could be in a box, where the box is tracked. Now a virtual tracking number could be assigned to each of twelve items in that box, and each of these items could be tracked.

The invention contemplates the use of multiple datapoints gathered about an item in transit, which datapoints are applied to various sets of rules to determine what actions may be taken in connection with transit of the item to assure delivery as agreed when the item was first shipped. Thus, various sensors may be included with the tag to gather information to supplement the positioning information typically provided with state of the art tracking systems. For example, the temperature gauge is used to measure the ambient temperature around the object. The temperature is periodically transmitted to the tracking system, which monitors the information. Checks are performed to see if the object temperature matches with the transportation means' temperature. For example, the tag temperature can be compared with the temperature tag on the truck transporting the object to determine if the object is on the truck. Similarly, the temperature can be compared to see if the object is in a warehouse, on a boat, or on a plane. This aspect of the invention also assures that temperature sensitive, e.g. perishable, items are properly handled during transport and can provide additional datapoints to correlate the supposed location of the item with its actual location. In this latter case for example, if an item shows a temperature that is higher than expected because the item is thought to be in a refrigerated vehicle, based upon a tracked location, then various rules may be applied to determine if the refrigerated vehicle is malfunctioning, if the location information is incorrect because the tracking signal is out of calibration, or if human intercession is required even though the item is where it is expected to be The barometer is implemented in a similar manner comparing the ambient pressure of the object with pressure measuring devices on the transportation means. The noise meter is used to measure the ambient noise around the object. Further, sensors may be provided to sense such factors as humidity, altitude, inclination/declination, levels and presence/absence of oxygen or other gases or chemicals, shock, acceleration, and the like.

Care must be taken to position each device properly. For example, a temperature gauge located too close to a truck engine gives readings which sample the engine's temperature, rather than the ambient temperature of the storage area of the truck. Thus, the temperature gauge should be located in the storage area of the truck. Also, there are often temperature and noise variations within a storage area. For example, on a large ship the temperature and noise levels can be higher on one side of the storage area than on the other, because one side of the compartment is closer to the engine than that of the other. For proper readings, multiple meters should be used, and they should be properly calibrated to take into account any variations. Calibration should also take into account whether the ship is moving or is stationary, because noise and temperature vary when the ship engine is on or off. Further, the system receives such ambient information not only from the tag associated with the item, but also from the transit vehicle, if desired, thereby providing correlating datapoints.

Logic rules are applied to the tracking information to include or exclude the information. One rule for excluding information is the information in question is inconsistent with of all other available information. For example, GPS tracking information indicates that the object is in Manila, Philippines. However, the object is supposed to be in Vancouver, Canada. Cellular tracking indicates it is in Vancouver, the temperature gauge indicates it is 30 degrees Fahrenheit, and the bar code of the tag was last tagged leaving Vancouver's main airport. The logic rules exclude the GPS information because it conflicts with all other information.

Another check could be against time. For example, if an object has been tracked at a location in time, and is later tracked at another location in time. If the object is on a direct flight, for example, and it takes about eleven hours to get from United States west coast to Europe, then it would be implausible if the item arrives in five hours.

Hierarchical rules are also applied to the tracking information, to give some information more weight than others. For example, when a tag on an object is scanned, then the scanning information is considered 100% accurate, thus all other information is excluded. This is because each bar code is unique, and for a bar code to be scanned it has to be physically present for the scanning machine to read it. However, this information is time sensitive because as time progresses, the object moves away from the scanned location. If the object was supposed to be in transit one hour after it was scanned, then the scanning information's weight drops to 0%.

At that point GPS tracking and cellular tracking comes into play. There are times when GPS tracking is not accurate, for example, when the satellites are not in a good position send or receive signals. At those times, the value of the GPS tracking information is reduced. For cellular technology, there are dead areas where cellular signals are hard to send or receive, and because this affects the accuracy of the tracking information, the value of the cellular tracking information is reduced. The accuracy of both of these tracking systems are weighed against each other and given apportioned weights.

Another hierarchical rule sets values on objects, relative to each other. If a first object is valued more than a second, then it receives better treatment. For example, a long time valued customer wishes to ship a large and highly profitable object. However, another object also needs to be shipped from a customer that never pays its bills on time, and rarely uses the TS's services. The shipping is such that only one object can be shipped on time because of availability. Thus, if one item is shipped on time, the other will be late. A user can set the hierarchical rules to favor the valued customer so that their object arrives on time. Similarly, the hierarchical rules can apply where a shipper of one object gets a lower price, while the another shipper gets a higher price. Again, a user can set the hierarchical rules so that the valued customer gets the lower price.

Figure 2:
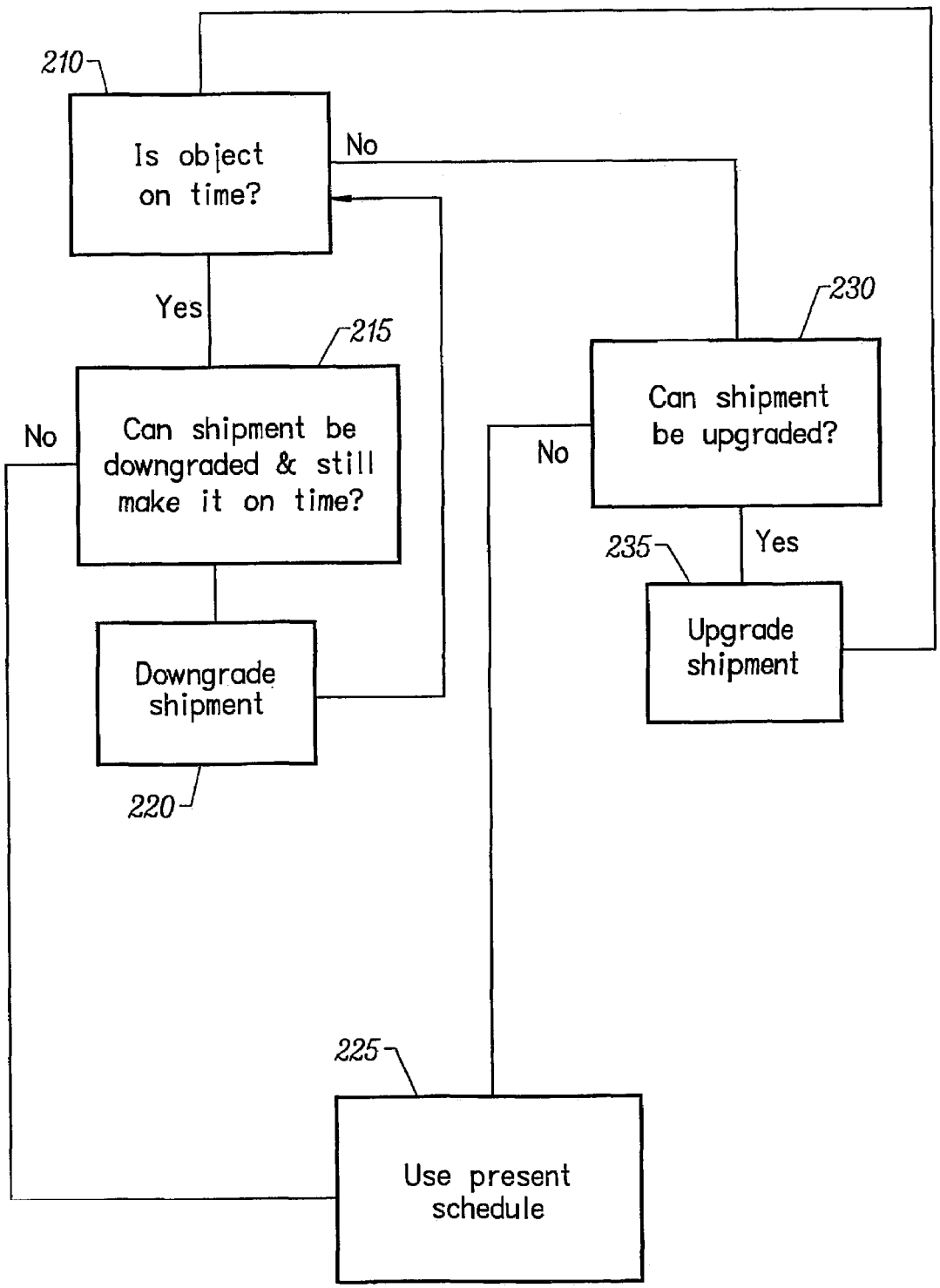
FIG. 2 is a flowchart illustrating the decision making process for upgrading or downgrading a transported object.

FIG. 2 is diagram of the logic scheme used to ensure that an object is delivered on time. It will be appreciated that, while timely delivery is often the most important factor in a shipment of items from on location to another, the manner in which the item travels may be of greater importance. For example, a fragile item may require special handling that justifies a delay, e.g. shipment in a cushioned or refrigerated transit vehicle may be of greater importance than shipment in the faster possible vehicle.

A schedule is developed for a transported object. The scheduler takes into account the weight, size, origin, and destination of the object. The scheduler also takes into account the type of carrier, the carrier's reliability, and any special knowledge of traffic conditions the carrier may face. Carrier's are chosen based on their capacity Thus, no carrier is chosen that does not have the capacity to carry an item. Scheduler information typically includes, delivery location and time, destination location and time, arrival times and locations for intermediate stops, and also calculated location and times within the stops. This information is used to map coordinates and to track the route the object and transports means take. Current and predicted weather are also taken into account. If snow or rain typically causes delays, then that information is taken into account.

Periodic checks are performed to see if the object is being transported according to schedule. The scheduler checks ask if the object is on time 210. If yes, then a check is performed to see whether the object can have its transportation downgraded and still arrive on time 215. Downgrades, for example, consist of, moving the object to a lower class (for example, from a plane to a truck, from a plane to a boat, or for example change the service level, such as guaranteed two day service, to deferred service, moving the object to a later and cheaper carrier in the same class, and moving the object to cheaper but less reliable carrier in the same class and at the same time. If the object can be downgraded and it is cheaper, it is downgraded 220; if it cannot, then the present schedule is used 225.

Similarly, if the object is not on time, then checks are performed to see if the transportation of the object can be upgraded 230. Upgrades consist of, for example, moving the object up a class, moving the object to an earlier carrier, or moving the object to a more reliable carrier. If the object can be upgraded 235, it is, unless there is an exorbitant cost. If the shipment cannot reach the destination on time, the customer is alerted as to its expected arrival time and the present schedule is used 225.

Checks can result in finding that the object is not on the carrier, or not on the intended carrier. The user of the system is alerted to that status. The user can manually choose an alternative means of transportation, or the system can automatically select the best transportation means, or alert the appropriate authorities if it appears that the item was stolen. The criteria used in is making these determinations can include, for example, whether the object will arrive on time, the means by which the object arrives the earliest, and whether the cost to ship is within reason. A typical reasonable cost increase is 10%.

Another check examines whether the object and the transportation means are moving in the same direction and at the same rate. This check is used to see if the object is on the proper transportation means. For example, the object arrives at a warehouse where it is moved from a first truck to a second truck. While the object is scanned before it is put on the second truck, a check can later be run to make sure the object and the truck are going in the same direction, and at the same speed. If the information from each tag matches, the system concludes from this that the object is on board the second truck. If not, the item may have been removed from the truck without proper authorization, i.e. stolen.

Often there are times when two or more objects must arrive at the same time. This occurs where multiple parts of a machine must be sent to the same location. The end user has no use for one part of the machine without the other. For these situations, all the objects are given schedules calculated to have all of the parts arrive around the same time. One method is to have each part shipped on the same transportation means. When this happens, the system monitors to make sure each piece of machinery makes the trip according to plan. Where one part lags behind the other, the part that is on time can be delayed so that it arrives with the other. This is especially beneficial where delaying the part results in a cost savings. Alternatively, the part that is lagging can have its shipping means upgraded.

Tracking tags are placed on shipping containers used to carry multiple smaller objects. The tracking tags used on the containers are the same used as on the transported object, although they may have additional protection to make them more durable. Checks are performed to see if the tracking information of the container is the same as that of the object. Conclusions are drawn based on the information. For example, if the tracking information indicates that the container is 50 meters away from the object, the conclusion drawn is that the object is not in the container. Similarly, if the object if found to be within one meter of the container, then the object is said to be in the container. Multiple tags can be used on a container for more accuracy. Greater accuracy may be desired if a user wants to know if an object is outside of the container, but still within close proximity. This is true where an object is removed and remains in the same warehouse as the container.

The TS also integrates well within a company's production system. Where a company manufactures and delivers their product on a regular, or even irregular basis, the system can automatically arrange for transportation. For example, a company (Company) regularly ships 100 widgets to a store (Store) every week. The store needs the widgets by 10 AM on Monday morning. Typically the widgets are constructed the week before, varying from early Thursday morning to late Friday evening. It is not known exactly at what time the 100 widgets will be completed until Wednesday afternoon.

With an integrated system, when the expected completion time is posted on the company's system, the transportation arrangements can also be made. In one example, the widgets are finished on Thursday at 3 PM. The company's system is updated and posts a need to deliver 100 widgets to the store's location, pickup at or after Thursday 3 PM, to be delivered to the store by Monday, 10 AM. The TS receives this request and makes arrangement to pick up the widget on Thursday at 3 PM to be delivered on Monday before 10 AM.

The system uses criteria which is most beneficial to the client. Because ground shipment is typically cheaper than air, ground is chosen first. If ground travel cannot deliver the product on time, then air is used. These criteria come into play in the above example, where, if the widgets are produced on Thursday, they can be shipped on time by ground, but if produced on Friday, then air is chosen by the transportation system.

The integrated system applies to irregular deliveries too. When the company wants to deliver an object or objects not regularly delivered, all it need do is post the request as described above. However, there are some differences.

With a regular delivery, there are typically carriers who are aware of the regular schedule, resulting in higher availability and lower prices. With an irregular delivery, transportation costs are typically higher, and availability is less. The TS provides available schedules in both situations.

Conversely, in the integrated system a company can know when to produce an object based on the availability of a carrier. For example, if a large object must be shipped by boat, and the boat is available only the first of every month, then a company can schedule completion of production of the object by the $28^{th}$ of the month. The company's system alerts a user if production is set incorrectly set because it conflicts with shipping availability.

Figure 3:
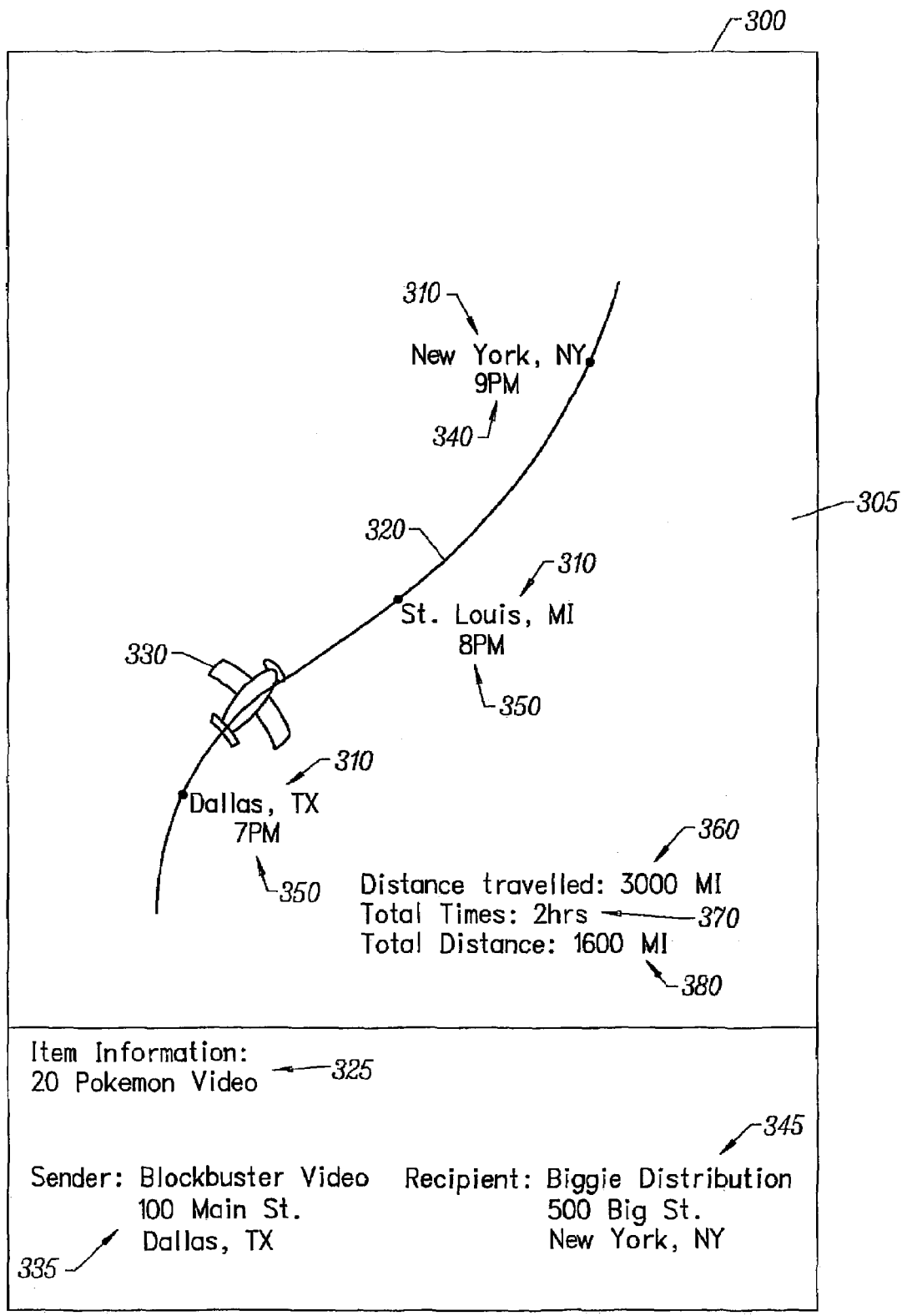
FIG. 3 is a diagram illustrating a graphical user interface according to the invention.

FIG. 3 illustrates a graphic user interface (GUI) 300 that is available to a user so that he may monitor the transportation of an object. The GUI features a graphical map 305 of surrounding landmarks 310 and the route 320 the object takes during its delivery. The type of transportation means is indicated by a representational icon, for example, an airplane icon 330. Also, the GUI 300 displays information such as, predicted time for arrival at the final destination 340, time for arrival at several stops 350, distance traveled 360, time of trip 370, total distance for delivery 380 and other related information. The GUI 300 also displays a description of the item 325, the sender's name and address 335, and the recipient's name and address 345.

The GUI can also display, for example, if a shipment relates to set of objects, which all must show up at same time, the GUI could show the whereabouts of all of the objects, interdependence, and items on a critical path, for example.

Figure 4:
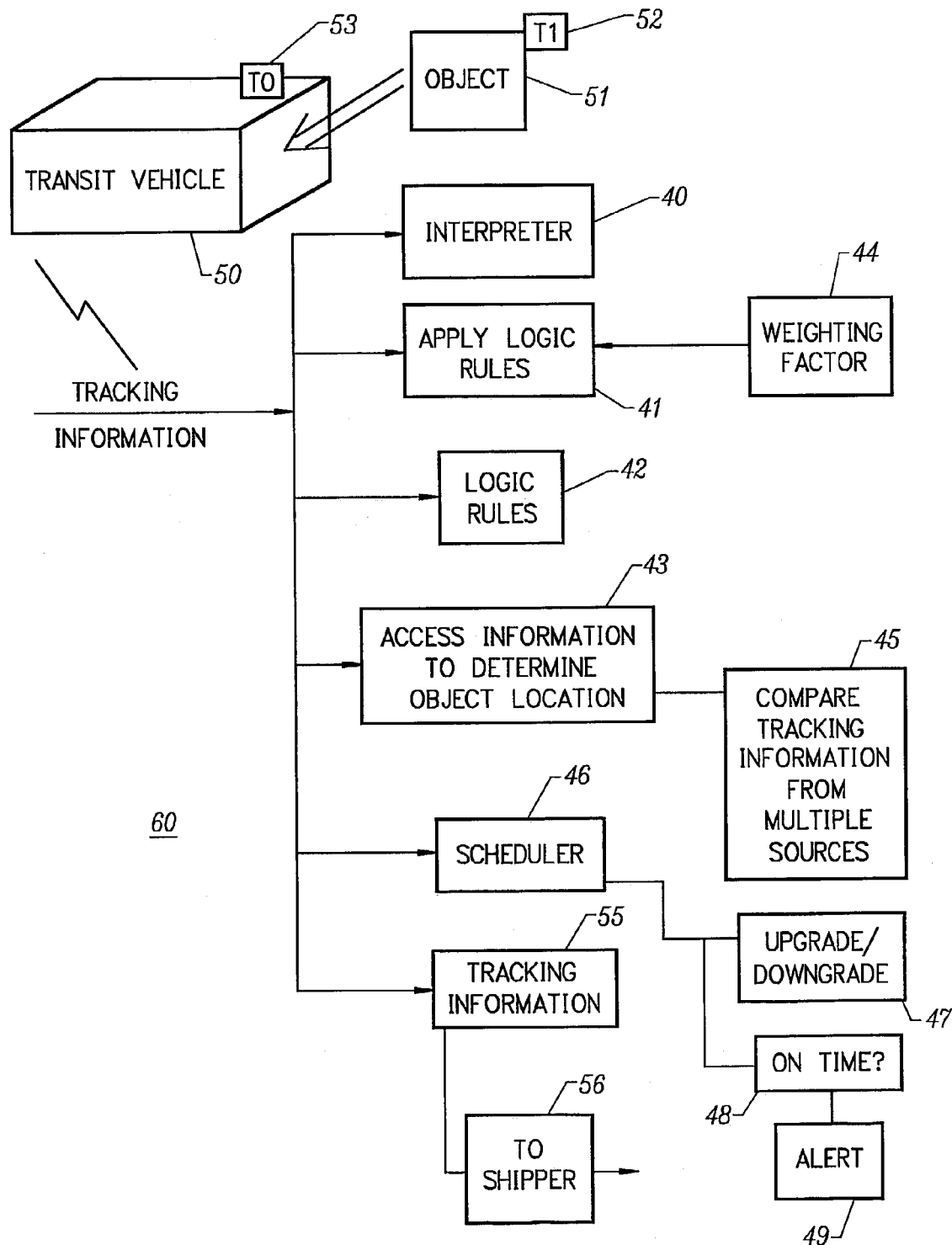
FIG. 4 is a block schematic diagram of a rule based proximity and time based tracking system according to the invention

FIG. 4 is a block schematic diagram of a rule based proximity and time based tracking system according to the invention. In this embodiment of the invention, an object 51 has an associated tag 52 (as discussed above) and is in transit in a transit vehicle/container 50, which also includes a tag 53. The object and vehicle/container provide various datapoints, referred to as tracking information, to an apparatus 60 for determining the position of the object. The apparatus comprising an information processing system, as is known in the art, which may comprise one or more computers, storage media, networking elements, and databases. Within the information processing system, is an interpreter module 40 that interprets the tracking information. Another module 41 applies logic rules 42, and sets values for various datapoints based upon one or more weighting factors 44. The system includes a module that assesses the tracking information to determine the object's location 43, and also includes a module that compares tracking information from the object and the vehicle/container 45 for use by the module that applies logic rules to reconcile conflicts in such tracking information. A scheduler module 46 receives interpreted tracking information and accesses a logic rules module 47 which for example determines whether an upgrade or downgrade is necessary or appropriate. The scheduler also accesses another logic rules module 48 that determines for example whether the item will arrive on time, and another logic rules module 49 that for example issues an alert to a shipper if the item is to be delivered behind schedule. The system also includes a module 55 that provides tracking information, and that includes another module 56 that can forward such information to the shipper. The above scheduler 46 and modules 47, 48, 49, 55 are examples of the modules or logic rules that are used in connection with the presently preferred embodiment of the invention. These modules and their applications are discussed in greater detail below.

Further aspects of the invention include any of the following:

Taking actions based on information about the position of an Object (for example, see the scheduler 46 above).

The information of one or multiple objects is related to the information known about one or multiple other objects and is used to calculate or estimate a desired target value. Such a desired value in the application of shipping is likely most frequently the expected arrival time, as outlined in the examples below, but it could also be any other value, such as cost or fuel consumption.

In addition third party information can be used in the calculation of the above estimate. Such information could be road or traffic conditions for example.

In another embodiment of the invention, the target could be multi-dimensional, such as target arrival time, but also a constraint/target on total shipping cost. For example, once the object package is identified as being on the object plane, information known about the object plane, such as the actual and/or planned flight information of expected arrival, is used to calculate the estimated arrival time of the package. Information about the object customs or average unloading times can be used to arrive at estimated time of arrival in the destination warehouse.

Over time the estimates can be updated to reflect new information.

Actual time can be compared to, related to planned time. Estimates can be compared to planned times. Such a comparison can also serve as plausibility check, warning that something is wrong, for example package seems to move toward wrong destination.

An example of relating actual time to planned time is tracking the performance of a carrier, such as an airline. The air waybill contains the flight information of a booked flight for cargo, such as scheduled departure, routing, and arrival. Comparing the tracking information of an object against the air waybill information allows a historic evaluation and rating of the performance of the carrier. It can be determined how many times an object on a specific flight has actually arrived on time, whereas on time can be defined in any manner, e.g. 30 minutes, or two hours. Furthermore, it can be determined how frequently the object has been routed as planned on the air waybill.

Additional logic rules can be linked to or driven by the estimated arrival time.

Such rules could include, but are not limited to:

Alert the user that the shipment is late or early, outside of certain preset parameters and/or deviating from plan;

Automatically take an action, which can be internal steps or external steps. Internal steps are performed by the system of the invention, external steps by other linked systems. Examples are:

An example of an automatic, pre-arrival step is, if expected arrival time is later than plan:

Move the object to a higher priority level or service level. For example, the item is shipped with the next available flight, or is upgraded from five day service to express service for the reminder of the transportation;

Rerouting and/or change of transportation mode. For example, for the next leg of transportation the shipment is moved from one mode of transportation to another one, e.g. from ocean to air;

Selecting transportation providers based on their performance, probability, and/or reliability;

The reverse could also be true. If arrival is ahead of schedule, the carrier could reduce priority, or change the route or transportation mode to reduce costs;

The system of the company where the delivery is to be made can take any changes to the arrival date into consideration and, for example:

Takes internal steps to adjust their own systems and processes to the new date;

Communicates back to the system of the invention to reschedule negotiate new arrival time, or take other related actions, such as rescheduling a series of other arrivals or pick up of shipments;

Look at linked objects. If in a supply chain shipment A and B must arrive at the same time, and A is determined to be late and the lateness can not be corrected, B can also be delayed, to give priority to another shipment;

Interdependent Shipment Management. The system could, for example, in a supply chain management situation, look at multiple shipments and manage their transportation, as outlined in the invention, to a degree that they all arrive at the right time in relation to each other, for example A, B arrives one day 1, and C arrives on day 2.

A shipment can be broken up into multiple sub-arrival dates, for example at hubs along the journey, with one final arrival date at final destination.

In another example, one could go backwards, e.g. by starting from the final arrival date, and calculating all intermediary steps as latest departure dates along the hubs as in the above example.

The system can collect historic data and decisions, then use that information to improve future actions/decisions (self-learning), and/or rate service providers. Thus, the system develop a profile of service providers (transportation companies) s based on history, which helps in the selection of the provider.

The system can potentially track a shipment from the time of order placement, which could be before the product is even produced. The system could thus be linked to, or integrated into, the production process. Thus, the system can estimate the time of readiness for shipment as well as the time of desired delivery. For example, if a customer orders a custom made car online and the company wants to deliver the vehicle within five working days, the system could be either used during the entire production process, or it could be sued to look into the production process to receive updated information when the car is ready for shipment. This information could then be used to schedule the transportation.

The system could also be used to manage the shipment and production process from the reverse. Assuming that the delivery date is a drop dead date, the system can determine when production should start, figure out the total process, and monitor the process, while taking appropriate actions to assure on-time delivery. Such approach readily accommodates the current just-in-time manufacturing philosophy.

Other Applications of the Invention

The invention is not limited to tracking shipments, as outlined above. It could be used to track any object in relation to another object, Some but not all examples are listed below:

- The military could track a soldier in relationship to others and or their equipment, and or where the soldier is and when he is expected to reach a new point;
- Law enforcement agencies could track a policeman in relationship to his car, potentially identifying dangerous situations and automatically calling reinforcements;
- The tracking persons on probation is possible in relation to where they are allowed to be and where they are not;
- Parents and/or schools could track children against a plan, e.g. the children should be in school;
- Lost or stolen items could be tracked, for example the distance between an authorized person and a valuable object could be tracked. Once the distance reaches certain parameters, an alarm is sounded to check out or monitor the situation or take other steps;
- certain objects need to be within certain parameters. Once these parameters are violated measures are taken. The measures could be automated responses;
- The invention allows the tracking of multiple persons in relationship to each other. This could determine whether a student is visiting a certain class by measuring proximity to a teacher at certain times;
- The invention allows the tracking of dangerous materials and goods against objects or locations where they should be;
- The invention allows the tracking of animals in relation to each other or to other objects;
- The invention allows the tracking of guns or other objects in relationship to authorized users and or authorized locations. The invention could, for example, detect guns in vicinity of schools;
- The invention provides a guidance system, in which the target object guides the object trying to reach the target.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A method for determining a location of an object, comprising the steps of:
   interpreting tracking information;
   applying logic rules to include or exclude said information;
   assessing all remaining information to determine said location of said object; and
   applying in hierarchical rules to said tracking information to establish a weight to each source of information.

2. The method of claim 1, wherein said tracking information comprises any of:
   data from wireless technology, environmental data, data using satellite technology, data from the Federal Aviation Association, and scanned bar code data.

3. The method of claim 2, wherein said wireless technology comprises any of:
   GPS and cellular phone technology.

4. The method of claim 2, wherein said environmental data comprises any of:
   local temperature of object and transportation means, local pressure of object and transportation means, ambient noise level of object and transportation means; and humidity, inclination/declination, presence or absence of gases or chemicals, acceleration, impact, and altitude.

5. The method of claim 1 wherein said hierarchical rules state that, when a bar code attached to said object is scanned, then that scanned location information is considered to be substantially 100% accurate.

6. The method of claim 5, wherein accuracy of said scanned location information is time sensitive.

7. The method of claim 1, wherein said weight of each source of information is dependent upon accuracy of said source.

8. The method of claim 1, further comprising the step of:
   gathering said tracking information with at least one tracking tag.

9. The method of claim 8, wherein multiple tracking tags are used to increase accuracy of said tracking information.

10. The method of claim 9, wherein said multiple tracking tags are calibrated to account for variances between tracking tag locations.

11. The method of claim 10, wherein said variances in said tracking information relate to temperature and noise.

12. The method of claim 8, further comprising the step of:
    storing said object in a container that is transported, said container having a tracking tag attached to it.

13. The method of claim 12, further comprising the step of:
    determining whether said object is within said container by comparing said object tracking information with said container tracking information to see if there is a close match.

14. The method of claim 1, further comprising the step of:
    checking to see if said object will arrive on schedule.

15. The method of claim 14, wherein said checking further comprises the step of:
    comparing rate and direction between a tracking tag attached to said object, and a tracking tag attached to a shipping means.

16. The method of claim 1, further comprising the step of:
upgrading a shipping of said object, said object being transported on a schedule from one point to another, if said object will not arrive on schedule.

17. The method of claim 16, wherein said upgrades comprises any of:
moving said object up a class, moving said object to an transportation means, and moving said object to a more reliable transportation means.

18. The method of claim 1, further comprising the step of:
alerting a user of a delay, if said tracking information indicates there will be a delay.

19. The method of claim 1, further comprising the step of:
providing said tracking information to a shipper, said shipper integrating said tracking information within a shipper's production system.

20. The method of claim 19, wherein said integration aids said shipper to schedule production.

21. The method of claim 1, further comprising the step of:
displaying said tracking information through a graphical user interface.

22. The method of claim 21, wherein said graphical user interface displays any of:
a map of a route said object takes as it is being transported,
predicted time for arrival at a final destination,
time for arrival at several stops,
distance traveled,
time of trip and
total distance for delivery, item origin, item destination, and item information.

23. A method for determining a location of an object, comprising the steps of:
interpreting tracking information;
applying logic rules to include or exclude said information;
assessing all remaining information to determine said location of said object;
applying hierarchical rules to said tracking information to establish a weight to each source of information; and
downgrading a shipping of said object, said object being transported on a schedule from one point to another, if said object will arrive on schedule.

24. The method of claim 23, wherein said downgrades comprise any of:
moving said object to a lower class, moving said object to a later and cheaper transportation means in a same class, and moving said object to cheaper but less reliable transportation means in said same class.

25. A method for determining a location of an object, comprising the steps of:
interpreting tracking information;
applying logic rules to include or exclude said information;
assessing all remaining information to determine said location of said object; and
excluding carriers who cannot carry said object, excluding tracking information which does not match a weight of other tracking information and concluding whether said object is with a transportation means if said tracking information of said object matches with a tracking information of said transportation means.

26. A method for determining a location of an object, comprising the steps of:
interpreting tracking information;
applying logic rules to include or exclude said information;
assessing all remaining information to determine said location of said object; and
providing a system scheduler that can route and track multiple objects, said objects to be scheduled and delivered at the same time;
wherein said system scheduler applies hierarchical rules between objects.

27. The method of claim 26, wherein said system scheduler calculates an estimated time for arrival for said objects, said objects transported by a transportation means.

28. The method of claim 26, wherein said system scheduler stores information regarding said object, said object information including any of:
sender, recipient, item description, and any special handling instructions.

29. The method of claim 26, wherein said hierarchical rule prioritizes at least one object over at least one other object.

30. The method of claim 29, wherein said priority comprises the step of:
removing a first object's transportation means so a second object can use said transportation means.

31. The method of claim 30, wherein said priority is based on ratings.

32. The method of claim 31, wherein factors for said ratings comprise any of:
length of time as a customer, what percentage of the time the customer pays on time, a customer's financial stability and customer volume.

33. An apparatus for determining a location of an object comprising:
a module within said information processing system for interpreting tracking information;
logic rules;
a module within an information processing system for applying said logic rules to include or exclude said information;
a module within said information processing system for assessing all remaining information to determine said location of said object;
a module within said information processing system for applying hierarchical rules to said tracking information to establish a weight to each source of information.

34. The apparatus of claim 33, wherein said tracking information comprises any of:
data from wireless technology, environmental data, data using satellite technology, data from the Federal Aviation Association, and scanned bar code data.

35. The apparatus of claim 34, wherein said wireless technology comprises any of:
GPS and cellular phone technology.

36. The apparatus of claim 34, wherein said environmental data comprises any of:
local temperature of object and transportation means, local pressure of object and transportation means, and ambient noise level of object and transportation means; and humidity, inclination/declination, presence or absence of gases or chemicals, acceleration, impact, and altitude.

37. The apparatus of claim 33, wherein said hierarchical rules state that when a bar code attached to said object is scanned, then that scanned location information is considered to be substantially 100% accurate.

38. The apparatus of claim 37, wherein accuracy of said scanned location information is time sensitive.

39. The apparatus of 33, wherein said weight of each source of information is dependent upon accuracy of said source.

40. The apparatus of claim 33, further comprising:
at least one tracking tag for gathering said tracking information.

41. The apparatus of claim 40, wherein multiple tracking tags are used to increase accuracy of said tracking information.

42. The apparatus of claim 41, wherein said multiple tracking tags are calibrated to account for variances between tracking tag locations.

43. The apparatus of claim 42, wherein said variances in said tracking information relate to temperature and noise.

44. The apparatus of claim 40, further comprising:
a container for storing said object, said container having a tracking tag attached to it.

45. The apparatus of claim 44, further comprising:
a module within said Information processing system for determining whether said object is within said container by comparing said object tracking information with said container tracking information to see if there is a close match.

46. The apparatus of claim 33, further comprising:
a module within said information processing system for checking to see if said object will arrive on schedule.

47. The apparatus of claim 46, wherein said checking further comprises:
comparing rate and direction between a tracking tag attached to said object, and a tracking tag attached to a transport vehicle.

48. The apparatus of claim 33, further comprising:
a module within said information processing system for upgrading a shipping of said object, said object being transported on a schedule from one point to another, if said object will not arrive on schedule.

49. The apparatus of claim 48, wherein said upgrades comprise any of:
moving said object up a class, moving said object to an transport vehicle, and moving said object to a more reliable transport vehicle.

50. The apparatus of claim 33, further comprising:
a module within said information processing system for alerting a user of a delay, if said tracking information indicates there will be a delay.

51. The apparatus of claim 33, further comprising:
a module within said information processing system for providing said tracking information to a shipper, said shipper integrating said tracking information within a shipper's production system.

52. The apparatus of claim 51, wherein said integration aids said shipper to schedule production.

53. The apparatus of claim 33, further comprising:
a graphical user interface for displaying said tracking information.

54. The apparatus of claim 53, wherein said graphical user interface displays any of:
a map of a route said object takes as it is being transported, predicted time for arrival at a final destination, time for arrival at several stops, distance traveled, time of trip and total distance for delivery, item origin, item destination, and item information.

55. An apparatus for determining a location of an object comprising:
a module within said information processing system for interpreting tracking information;
logic rules;
a module within an information processing system for applying said logic rules to include or exclude said information;
a module within said information processing system for assessing all remaining information to determine said location of said object;
a module within said information processing system for applying hierarchical rules to said tracking information to establish a weight to each source of information;
a module within said information processing system for downgrading a shipping of said object, said object being transported on a schedule from one point to another, if said object will arrive on schedule.

56. The apparatus of claim 55, wherein said downgrades comprise any of:
moving said object to a lower class, moving said object to a later and cheaper transport vehicle in a same class, and moving said object to cheaper but less reliable transport vehicle in said same class.

57. An apparatus for determining a location of an object comprising:
a module within said information processing system for interpreting tracking information;
logic rules;
a module within an information processing system for applying said logic rules to include or exclude said information;
a module within said information processing system for assessing all remaining information to determine said location of said object;
a module within said information processing system for applying hierarchical rules to said tracking information to establish a weight to each source of information;
excluding carriers who cannot carry said object, excluding tracking information which does not match a weight of other tracking information and concluding whether said object is with a transport vehicle if said tracking information of said object matches with a tracking information of said transport vehicle.

58. An apparatus for determining a location of an object comprising:
a module within said information processing system for interpreting tracking information;
logic rules;
a module within an information processing system for applying said logic rules to include or exclude said information;
a module within said information processing system for assessing all remaining information to determine said location of said object;
a module within said information processing system for applying hierarchical rules to said tracking information to establish a weight to each source of information;
a system scheduler that can route and track multiple objects, said objects to be scheduled and delivered at the same time, wherein said system schedule applies hierarchical rules between objects.

59. The apparatus of claim 58, wherein said system scheduler calculates an estimated time for arrival for said objects, said objects transported by a transport vehicle.

60. The apparatus of claim 58, wherein said system scheduler stores information regarding said object, said object information including any of:
sender, recipient, item description, and any special handling instructions.

61. The apparatus of claim 58, wherein said hierarchical rule prioritizes at least one object over at least one other object.

62. The apparatus of claim 61, wherein said priority comprises:

removing a first object's transportation means so a second object can use said transport vehicle.

63. The apparatus of claim 61, wherein said priority is based on ratings.

64. The apparatus of claim 63, wherein factors for said ratings comprise any of:
   length of time as a customer, what percentage of the time the customer pays on time, a customer's financial stability, and customer volume.

65. A method for using tracking data about a location of an object, comprising the steps of:
   collecting tracking data;
   providing other information;
   establishing a relationship between said data and said other information; and
   based on said relation between said tracking data and said related information, taking at least one predetermined action;
   whereas said other information comprises any of:
      a schedule, which in turn comprises any of:
         a shipping schedule;
         a production schedule;
         a schedule showing times when an object shipped is needed at a destination; and
      third party information; and
      further comprising the step of: a linked objects, and if in a supply chain where a first shipment and a at least a second shipment must arrive at a same time, where one of said first and said at least second shipment is determined to be late and said lateness can not be corrected, said other of said first shipment and said at least second shipment can also be delayed, wherein priority is optionally given to another shipment.

66. The method of claim 65, wherein with regard to said third party information, once an object package is identified as being on an object transport vehicle, information known about said object transport vehicle, which may optionally include any of actual and/or planned transit information, and expected arrival, is used to calculate an estimated arrival time of said object package.

67. The method of claim 65, where said predetermined action comprises any of the following:
   alerting a user that a shipment is any of late, early, or outside of certain preset parameters end/or deviating from a plan;
   automatically taking an action which can comprise any of internal steps or external steps, wherein internal steps are performed by a system executing the method of claim 65, and wherein external steps are performed by other linked systems which may include any of:
      an automatic, pre-arrival step which is, executed if an expected arrival time is later than a plan time;
         moving said object to a higher priority level or service level;
         rerouting and/or changing a transportation mode;
         selecting transportation providers based on any of their performance, probability, and reliability;
         reducing any of priority, route, and transportation mode if arrival is ahead of schedule; and
         taking any changes of arrival date into consideration, and a company where a delivery is to be made performing any of:
            taking internal steps to adjust their own systems and processes to a new date; and
            communicating back to a system executing the method of claim 65, to perform any of rescheduling, negotiating new arrival time, or taking other related actions, which may include any of rescheduling a series of other arrivals or picking up of shipments.

68. The method of claim 65, wherein in a supply chain management application, said method further comprising the step of looking at multiple shipments and managing their transportation to a degree such that they all arrive at a correct time.

* * * * *